(No Model.)
M. H. WHALEN.
RELEASING DEVICE.
No. 384,106. Patented June 5, 1888.
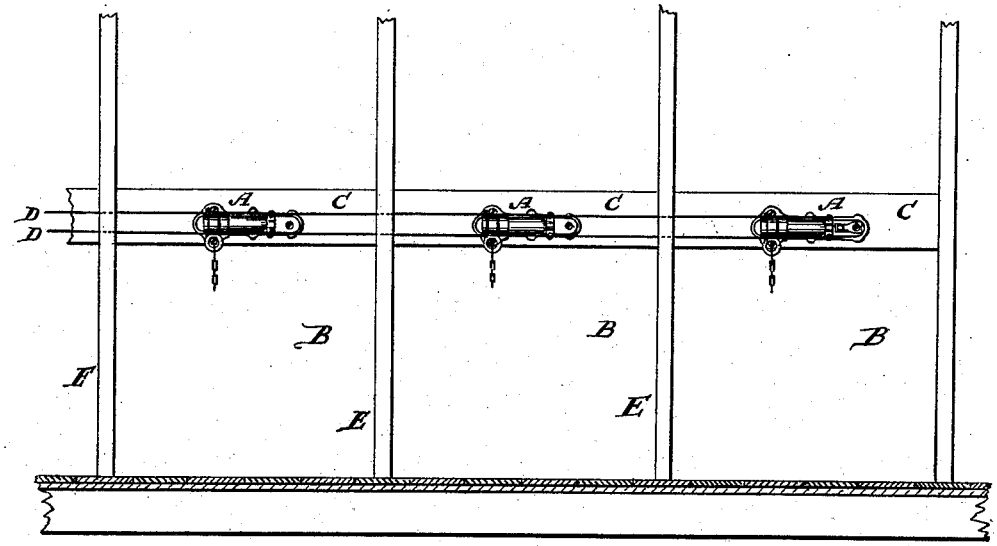
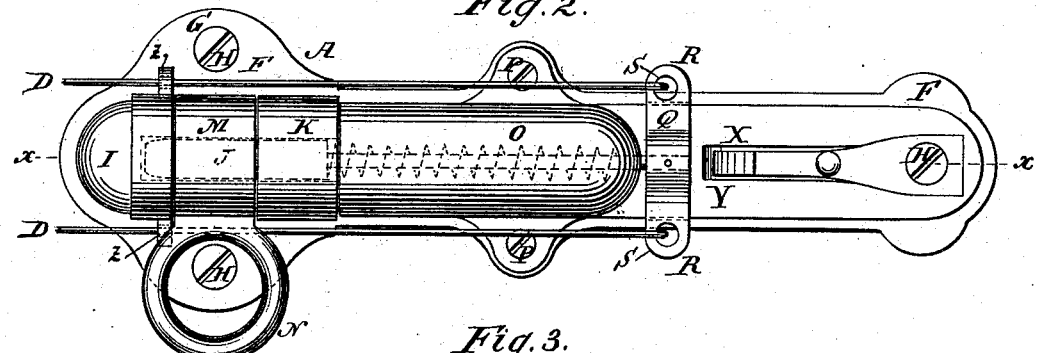
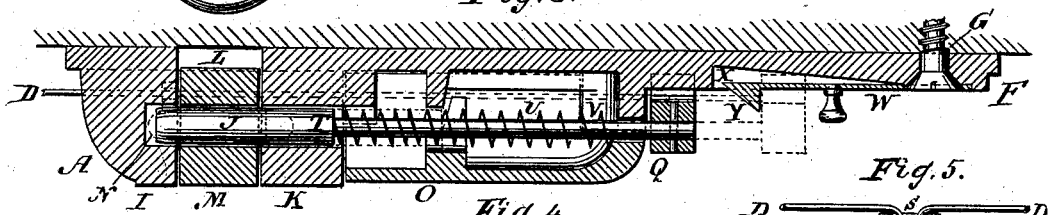
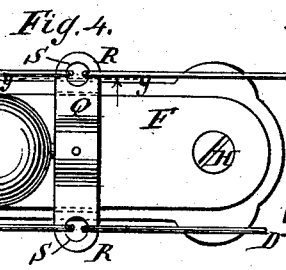
WITNESSES:
Edward Wolff
William L. Miller
INVENTOR.
Michael H. Whalen.
BY
Van Santvoord & Stauff
ATTORNEYS

UNITED STATES PATENT OFFICE.

MICHAEL H. WHALEN, OF BROOKLYN, NEW YORK, ASSIGNOR TO HIMSELF, JOHN C. VAN BRUNT, AND EDWIN L. SINSABAUGH, ALL OF SAME PLACE.

RELEASING DEVICE.

SPECIFICATION forming part of Letters Patent No. 384,106, dated June 5, 1888.

Application filed March 17, 1888. Serial No. 267,516. (No model.)

*To all whom it may concern:*

Be it known that I, MICHAEL H. WHALEN, a citizen of the United States, residing at Brooklyn, in the county of Kings and State of New York, have invented new and useful Improvements in Releasing Devices, of which the following is a specification.

This invention relates to devices for releasing horses and other animals in stables or other places where they are fastened; and it consists in certain improvements, which are described in the following specification, reference being had to the accompanying drawings, in which—

Figure 1 represents the device arranged in the stalls of a stable ready for use. Fig. 2 is a front elevation of the device. Fig. 3 is a longitudinal section taken on the line $x$ $x$ of Fig. 2. Figs. 4 and 5 show the manner of connecting the device with the line-wires by which a series is operated at once.

Similar letters indicate corresponding parts.

The letter A designates my improved releasing device. It is shown in Fig. 1 applied to several stalls, B B B, of a stable, being secured to the front part of the mangers C C C, the line-wires D being shown as extending from one device A to another and passing through the partitions E of the stalls.

The device A consists of a bed-plate, F, which is provided with holes G G G to receive screws H, that serve to fasten the device to the front of a manger or other convenient place. From the front of the bed-plate F, at its left-hand end, rises a socketed lug, I, whose socket receives the end of a sliding bolt, J, which passes through a perforated lug, K, that also rises from the front of the bed-plate. There is a space, L, between the lugs I and K, which is provided for the purpose of securing the hitching-loop M, which, when in place in the space L, is engaged by the bolt J, which passes through it on its way from the lug K to the socket of lug I. The loop M is provided with a halter-ring, N, to which a halter or strap from the head of a horse can be fastened in the usual manner.

On the right hand of the lug K is a box, O, which is fitted upon the bed-plate F, and fastened thereto by screws P. The bolt J extends through and beyond the box O, and is fastened to a cross-head, Q, arranged transversely to the bed-plate, and having its ends R R adapted to slide upon the outer edges of the bed-plate. The ends R R of the cross-head are perforated, as at S S, to receive the wires D D, which are fastened to the cross-head, and which extend from one device to the next, and so on throughout the series, being fastened to the ends of each cross-head, so that by pulling the cross-head of the device at the right of the series the cross-head of each device of the series will be actuated. The wires should be flexible, so that they can be readily fastened and adjusted on the cross-heads.

The bolt J is reduced in diameter where it enters the box O, and a shoulder, T, is formed on the bolt, against which one end of a coiled spring, U, bears, as shown in Fig. 3. The other end of the spring bears against the right-hand end of the box at the point V, where the bolt passes through that end, so that if the bolt be moved toward the right by a pull on the cross-head the spring will be compressed between the shoulder T and the end of the box at V, and will, when released, tend to slide the bolt back toward the left. The bolt is held stationary after it has been moved toward the right by means of a spring-catch, W, arranged in a depression, X, on the face of the bed-plate, and which is constructed and adapted to allow the cross-head Q to pass over its inclined latch Y and to be engaged by the shoulder of the latch, as indicated in dotted lines in Fig. 3, whereby the cross-head and bolt are kept from yielding to the tension of the coiled spring U. The movement of the bolt to the right withdraws the bolt J from the socketed lug I and from the loop M, and allows the loop M to fall out of the space L, thus releasing the horse or other animal.

It is obvious that the series of releasing devices described and shown can be extended through a number of stalls, the line-wires for operating them being extended likewise. It is only necessary that the first device at the right of the series be provided with the spring-catch W; but each one in the series can be so provided, if thought desirable. One of the advantages of the spring-catch consists in the fact that the bolt or bolts of all the releasing devices are held unlocked when the latch engages the cross-head, and security thereby results against the possible re-engagement of the hitching-loops by the bolts in case the operator suddenly or in too great haste releases the line-wires or cross-heads after attempting to unlock the loops.

It is obvious that an advantage arises from the employment of wires over rods or bars for connecting to each other and operating the series of releasing devices, as they can, when made of wire, be adjusted and lengthened or shortened without the use of elaborate tools or skilled labor, so as to make the various bolts operate in unison and be effective at one and the same operation and secure the unhitching of all the loops at once.

The loops M are made of light material, so as not to injure the legs of the animal when released, and they may be made of rope or other fibrous material.

The line-wires are supported by passing through ears Z Z, which extend from the sides of lug I, and also by the cross-heads and the sides of the stalls.

In the sectional Fig. 5, which is a section taken on the line $y\ y$ of Fig. 4, looking in the direction of the arrow, I show more in detail the method of connecting the line-wires, which are in sections extending from cross-head to cross-head, with the cross-heads R, the same consisting in forming a hook, 1, on the end of each section of the wire and inserting the hook in the perforation S of the cross-head. This method enables one to connect the sections of the wires to the cross-heads independently of each other, and consequently each can be separately disconnected, the wires being flexible, so that it is possible to manipulate them and connect and disconnect them at pleasure, with the result that by disconnecting the proper sections of wire from any cross-head the device A of that cross-head, or more than one of the devices, can be isolated from the other, and in this manner some of them can be put out of action and others left in the line of action.

What I claim as new, and desire to secure by Letters Patent, is—

1. The combination of the sliding bolt J, cross-head Q, line-wires D D, lugs I K, loop M, and box O, with the spring-catch W, substantially as shown and described.

2. The combination of the series of bed-plates F, each having the lugs I K, the spring-impelled bolts J, each having a cross-head, Q, provided with upper and lower perforations S, and the upper and lower line-wires D D, made in sections, with a pair of said sections arranged between each pair of cross-heads, and having hooks 1 at their ends engaging the perforations in the cross-heads, substantially as shown and described.

In testimony whereof I have hereunto set my hand and seal in the presence of two subscribing witnesses.

MICHAEL H. WHALEN. [L. S.]

Witnesses:
J. VAN SANTVOORD,
E. F. KASTENHUBER.